3,181,125
SIGNAL READOUT SYSTEM FOR THERMO-
PLASTIC RECORDINGS
Paul Vadopalas, Palo Alto, Calif., assignor to Ampex Corporation, Redwood City, Calif., a corporation of California
Filed Feb. 20, 1962, Ser. No. 174,571
7 Claims. (Cl. 340—173)

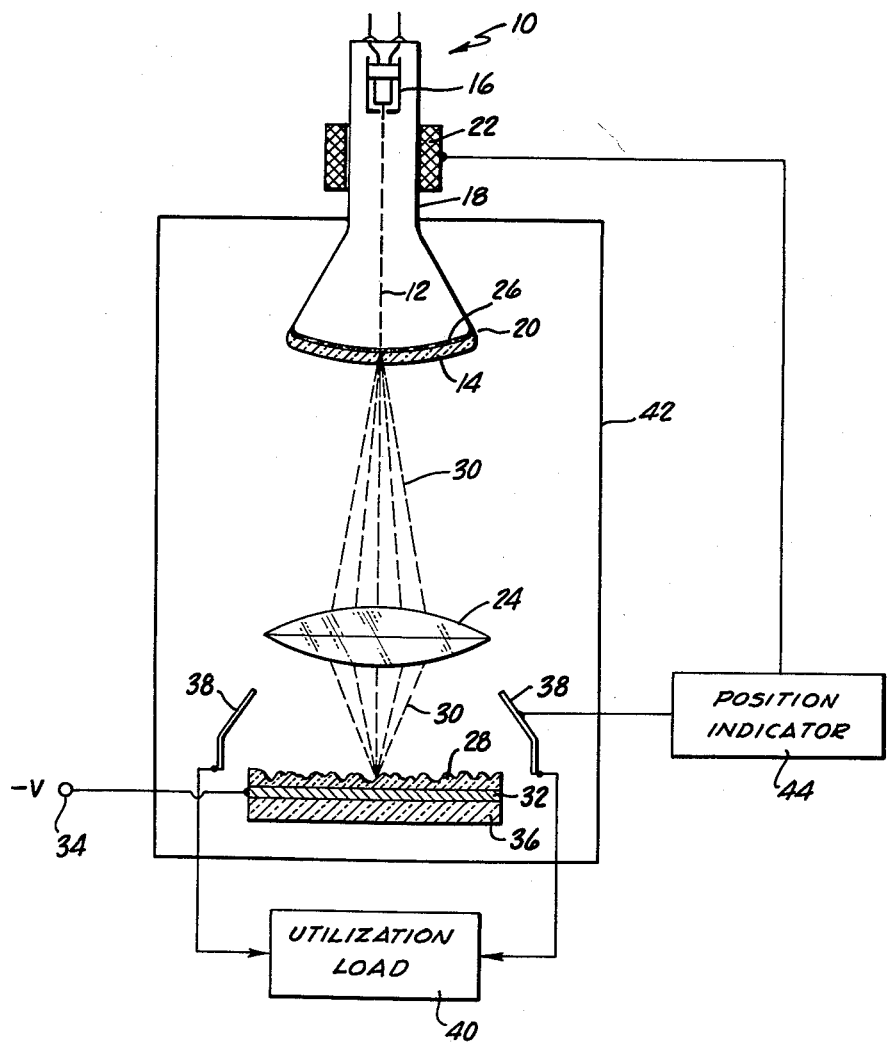

This invention relates to a signal readout system, and in particular to an improved system for the readout of signal information registered on a thermoplastic medium.

One method of thermoplastic recording is achieved by means of directing a modulated electron beam that impinges on a thermoplastic medium. During the recording process, signal information is stored on the thermoplastic surface. The depth and width of each depression that is formed at any instant is determined by the intensity of the modulated electron beam at that instant. The modulated beam of electrons may be directed at the thermoplastic in a raster fashion, scanning the thermoplastic target in a manner similar to television scanning methods. The indentations or depressions in the thermoplastic become fixed upon cooling, and serve to provide a topographical configuration that may be subsequently utilized for reproduction as an electrical signal or a visual image.

Various approaches have been proposed for reproducing the signal information that is stored by the thermoplastic medium. For example, readout of the stored signal may be achieved by electron beam scanning of the thermoplastic target, whereby reflected primary electrons or secondary emission electrons are collected and the resultant electrical signal is utilized as the playback signal. The number of electrons reflected or emitted is directly proportional to the degree of the recorded indentation at the particular discrete area of the medium being scanned. However, the electrons of the readout scanning beam, which are of negative charge, are affected by the proximity of a varying number of electrons present in the adjacent indentations in the thermoplastic, as well as the reflected primaries or released secondaries, which create electric fields. These fields deflect the beam from its correct scanning path causing erratic tracking which results in a distorted output signal.

It has also been proposed to employ visible light radiation, which does not react to the electron charges stored in the thermoplastic, for scanning the thermoplastic target for the purpose of readout. But the energy supplied by visible light rays does not release a substantial number of electrons that may be utilized for thermoplastic readout, and therefore it is generally necessary to employ expensive accessory equipment to amplify the readout signal.

It is known that radiation having a shorter wavelength than visible light, such as in the ultraviolet range, has substantially more energy than radiation in the visible light spectrum, although less than electron beam energy. It would be desirable to employ short wavelength or ultraviolet energy to increase the electron output from a recorded thermoplastic recording during the readout mode.

An object of this invention is to provide an improved system for readout of a signal recorded on a thermoplastic medium.

Another object of this invention is to provide a system that employs relatively short wavelength radiation to increase the output from a thermoplastic medium during the reproduce mode.

In one embodiment of this invention, a thermoplastic readout system comprises a cathode ray tube for providing a scanning electron beam, an ultraviolet radiation producing phosphor disposed in the path of such electron beam, and an optical system for focusing the ultraviolet radiation produced at each discrete area of the phosphor screen onto a corresponding discrete area of a thermoplastic medium. Collector and utilization means are further provided respectively to receive the electrons that leave the scanned thermoplastic and to utilize the collected electrons as an electrical signal.

The invention will be described in greater detail with reference to the sole figure of the drawing, which is a schematic plan view of one embodiment of the readout system of this invention.

In the figure, a cathode ray tube 10 provides an electron beam 12 that scans the face 14 of the cathode ray tube in a fashion similar to a television raster screen. The electron beam 12 is derived from an electron gun 16 within the evacuated envelope 18 of the cathode ray tube 10 and impinges on an ultraviolet producing phosphor layer 20 formed on the inner surface of the glass face plate 14 of the tube. Suitable deflection and focusing means are provided, such as the deflection yoke 22 encompassing the neck of the cathode ray tube, for directing the beam 12 in its scanning path. Also, suitable potentials are applied to the several electrodes of the cathode ray tube from power supplies (not shown).

When the electron beam 12 strikes the phosphor layer 20 at any given discrete area, the phosphor layer at that point emits a multiplicity of photons of given wavelength which in effect is radiation in the ultraviolet region. The ultraviolet radiation 30 which emanates from the point of impingement of the electrons is received by an optical lens 24 or focusing system spaced from the face plate 14 of the cathode ray tube. To prevent the loss of emitted photons by a random distribution, a thin aluminum layer 26 is fixed on the phosphor layer 20 so as to reflect the photons toward the optical system 24.

The optical system 24 is so spaced between the phosphor layer 20 and the thermoplastic medium 28 that the ultraviolet radiation 30 is formed on the thermoplastic 28. As the electron beam 12 scans the phosphor 20, the radiation 30 sequentially scans discrete areas of the thermoplastic 28, these areas corresponding to the sequentially scanned areas of the phosphor 20. As the photons of ultraviolet 30 impinge on any discrete area of the thermoplastic 28, a number of electrons are emitted from the surface of the thermoplastic layer. The number of electrons that are released from the thermoplastic 28 vary in proportion with the depth and slope of the discrete areal indentation that is being scanned.

The thermoplastic layer 28 is disposed on a conductive layer 32 that is set on a substrate 36, such as glass or plastic, and is tied to a high negative voltage supply 34. A single layer of conducting glass may be used in lieu of the layer 32 and substrate 36. The negative conducting layer 32 urges the electrons away from the thermoplastic 28 and towards a pair of collector electrodes 38, which are coupled to a source of positive potential, such as ground (not shown). The free electrons are thus collected to provide an electrical signal representative of the scanned area of the thermoplastic. The electrical signal is then supplied to a utilization load 40 that further processes the signal.

As illustrated, the thermoplastic structure and the collector electrodes 38 are enclosed in an evacuated housing 42. A position indicator 44 may be coupled to the collectors 38 and the deflection system of the cathode ray tube so that the instantaneous signal being read out may be correlated with a discrete area on the thermoplastic surface.

It is understood that the scope of the invention is not limited to the particular configuration described above, but encompasses various modifications of the basic concept. For example, the phosphor 20 may generate short wavelength radiation other than ultraviolet. Also, other scanning means may be employed instead of the cathode ray tube and the optical system.

Furthermore, erasure of the record across the entire thermoplastic surface may be achieved expediently by simultaneous flooding of the surface with ultraviolet radiation. This may be accomplished by a quartz lamp providing an erasing ultraviolet flood beam. Also rapid electron beam scanning may be used for erasure prior to writing a new signal on the thermoplastic.

What is claimed is:

1. A system for reading out signal information stored on a thermoplastic medium comprising: a means for producing radiation in the ultraviolet region; means for directing and impinging said ultraviolet radiation on the thermoplastic medium to release electrons representative of the stored signal information; and means for utilizing such released electrons to reproduce the signal information.

2. A system for reading out signal information stored on a thermoplastic medium comprising:
   a relatively high energy radiation producing phosphor spaced from such medium;
   means for providing a source of energy for activating such phosphor to produce such relatively high energy radiation;
   means for directing such high energy radiation to impinge on the thermoplastic to release electrons representative of the stored signal information;
   means for collecting such released electrons; and
   means for utilizing such collected electrons to reproduce the signal information.

3. A system for reading out signal information stored on a thermoplastic medium comprising:
   a relatively high energy radiation producing phosphor spaced from such medium;
   means for providing a source of energy for activating such phosphor to produce such relatively high energy radiation;
   means for directing such high energy radiation to impinge on the thermoplastic to release electrons representative of the stored signal information;
   means for repelling such released electrons from the thermoplastic;
   means for collecting such repelled electrons; and
   means for utilizing such collected electrons to reproduce the signal information.

4. A system for reading out signal information stored on a thermoplastic medium comprising:
   means for providing an electron beam;
   an ultraviolet radiation producing phosphor disposed in the path of said electron beam;
   an optical lens system spaced from said electron beam producing means for receiving the ultraviolet radiation and for directing such radiation onto the thermoplastic to release electrons therefrom;
   collector electrodes for receiving electrons as the electrons leave the surface of the thermoplastic; and
   a utilization means coupled to such collector electrodes.

5. A system for reading out signal information stored on a thermoplastic medium comprising:
   a cathode ray tube for providing a scanning electron beam;
   a phosphor layer disposed in the path of said scanning electron beam for producing short wavelength radiation in response to the impingement of the beam;
   a radiation focusing system, spaced from said phosphor layer, for receiving the produced radiation and for directing such radiation onto discrete areas of the thermoplastic in a pattern related to the scanning of the electron beam whereby electrons are released from the thermoplastic;
   collector electrodes for receiving the released electrons; and
   a utilization means coupled to such collector electrodes.

6. A system for reading out signal information stored on a thermoplastic medium comprising:
   means for providing an electron beam that follows a predetermined scanning pattern in response to a deflection system;
   an ultraviolet radiation producing phosphor layer disposed in the path of said scanning electron beam;
   an optical lens system spaced from such electron beam producing means for directing the ultraviolet radiation onto the thermoplastic medium in the predetermined scanning pattern;
   a metallic reflecting layer located between the electron beam and the phosphor layer for reflecting the ultraviolet radiation towards said optical lens system;
   collector electrodes for receiving electrons in sequence as the electrons leave the surface of the thermoplastic at those areas being scanned;
   a position indicator for indicating the location of each discrete area being scanned at any given instant, coupled to the collector electrodes and the deflection system; and
   a utilization load coupled to the collector electrodes for providing an electrical signal representative of the number and sequence of electrons received by the collector electrodes.

7. A system for reading out signal information stored on a thermoplastic medium comprising:
   means for providing an electron beam that follows a predetermined scanning pattern in response to a deflection system;
   an ultraviolet radiation producing phosphor layer disposed in the path of said scanning electron beam;
   an optical lens system spaced from such electron beam producing means for directing the ultraviolet radiation onto the thermoplastic medium in the predetermined scanning pattern;
   a thin aluminum reflecting layer located between the electron beam providing means and the phosphor layer for reflecting the ultraviolet radiation towards said optical system;
   collector electrodes for receiving electrons in sequence as the electrons leave the surface of the thermoplastic at those areas being scanned;
   a negatively charged layer disposed adjacent to the thermoplastic to urge the electrons toward the collector electrodes;
   a position indicator for indicating the location of each discrete area being scanned at any given instant, coupled to the collector electrodes and the deflection system; and
   a utilization load coupled to the collector electrodes for providing an electrical signal representative of the number and sequence of electrons received by the collector electrodes.

References Cited by the Examiner

UNITED STATES PATENTS

| | | | |
|---|---|---|---|
| 2,692,945 | 3/51 | Beaumont | 328—230 |
| 2,731,560 | 1/56 | Krawinkel | 313—68 |
| 2,943,230 | 6/60 | Lawrence | 313—68 |

IRVING L. SRAGOW, *Primary Examiner.*